(12) United States Patent
Dang et al.

(10) Patent No.: US 11,926,205 B2
(45) Date of Patent: Mar. 12, 2024

(54) ELECTRIC AXLE CONNECTION SEAL

(71) Applicant: Rivian IP Holdings, LLC, Plymouth, MI (US)

(72) Inventors: Dang Dinh Dang, Garden Grove, CA (US); Logan Noel Balliett, Los Angeles, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 406 days.

(21) Appl. No.: 17/490,758

(22) Filed: Sep. 30, 2021

(65) Prior Publication Data

US 2023/0099817 A1 Mar. 30, 2023

(51) Int. Cl.
*H02K 11/33* (2016.01)
*B60K 1/00* (2006.01)
*H02K 5/10* (2006.01)

(52) U.S. Cl.
CPC ............... *B60K 1/00* (2013.01); *H02K 5/10* (2013.01); *H02K 11/33* (2016.01)

(58) Field of Classification Search
CPC ...... H02K 5/10; H02K 11/33; H02K 2203/06; H01B 17/24–17/308; H01B 17/58–17/586
See application file for complete search history.

(56) References Cited

U.S. PATENT DOCUMENTS

2023/0377777 A1* 11/2023 Guntermann ............ H02K 5/10

* cited by examiner

*Primary Examiner* — Ramon M Barrera
(74) *Attorney, Agent, or Firm* — Foley & Lardner LLP

(57) ABSTRACT

A connection rod seal for sealing an interface between a connection rod and a motor cover of an electric motor is disclosed. The connection rod seal includes a body, a radial seal, and a face seal. The body includes a through hole formed therein. The through hole is adapted to receive the connection rod. The radial seal is positioned within the through hole and is adapted to form a seal with the connection rod. The face seal is positioned at a bottom surface of the body and extends completely around the through hole at the bottom surface. The face seal is adapted to form a seal with an outer surface of the motor cover.

20 Claims, 10 Drawing Sheets

US 11,926,205 B2

ELECTRIC AXLE CONNECTION SEAL

INTRODUCTION

The present disclosure generally relates to an electric axle for a vehicle. More particularly, the present disclosure relates to an electrical connection seal for a connection between an inverter and a busbar of the electric axle.

In electric vehicles, one or more electric axles (e-axles), function as a power source to drive one or more wheels (or other propulsion device) of the electric vehicle. In e-axle configurations, it is desirable to reduce the package size thereof, ensure proper cooling thereof, and to provide both visual and physical access to the various connections made during the manufacture of the e-axle, such as the connection between the inverter and the busbar of the e-axle.

The present background is provided as illustrative environmental context only and should not be construed as being limiting in any manner. The principles of the present disclosure may be applied in other environmental contexts equally.

SUMMARY

The present disclosure generally provides an e-axle with connection rods forming a connection between the electric motor and the inverter where the connection rod to inverter connection is made outside of the electric motor. Connection rod seals each include a radial seal adapted to form a seal with the connection rod and a face seal adapted to form a seal with the motor cover. By forming the connection between the connection rods and the inverter outside of the electric motor, the high-voltage, high-current connection between the inverter and the motor stator can be made with both hand a visual access that does not require an access panel/window while forming the connection thereof. Furthermore, with both the radial seal being formed with the connection rod and the face seal being formed with the motor cover, the cover through holes for the connection rods can be oversized to accommodate potential misalignment between the connection rods and the motor cover during assembly of the e-axle while ensuring that cooling fluid within the motor does not leak therethrough.

In one illustrative embodiment, the present disclosure provides a connection rod seal for sealing an interface between a connection rod and a motor cover of an electric motor. The connection rod seal includes a body, a radial seal, and a face seal. The body includes a through hole formed therein. The through hole is adapted to receive the connection rod. The radial seal is positioned within the through hole and is adapted to form a seal with the connection rod. The face seal is positioned at a bottom surface of the body and extends completely around the through hole at the bottom surface. The face seal is adapted to form a seal with an outer surface of the motor cover.

In another illustrative embodiment, the present disclosure provides an electric axle. The electric axle includes an electric motor, an inverter, a connection rod, a connection rod seal, a radial seal, and a face seal. The electric motor includes a motor cover. The motor cover includes a cover through hole. The inverter is positioned outside of a motor housing of the electric motor. The connection rod electrically connects a motor stator of the electric motor to the inverter. The connection rod extends through the cover through hole. The connection rod seal includes a body. The body includes a seal through hole formed therein. The seal through hole receives the connection rod. The radial seal is positioned within the seal through hole and forms a seal with the connection rod. The face seal is positioned at a bottom surface of the body and extends. The radial seal is positioned within the seal through hole and forms a seal between the connection rod seal and the connection rod. The radial seal is incorporated into one of the connection rod seal and the connection rod. The face seal is positioned between a bottom surface of the body and an outer surface of the motor cover. The face seal extends completely around the seal through hole and the connection rod at the bottom surface, forms a seal between the bottom surface of the body and an outer surface of the motor cover, and is incorporated into one of the connection rod seal and the motor cover.

In a further illustrative embodiment, the present disclosure provides a vehicle. The vehicle includes a vehicle body, an electric axle, and at least one wheel. The electric axle includes an electric motor, an inverter, a connection rod, a connection rod seal, a radial seal, and a face seal. The electric motor includes a motor cover. The motor cover includes a cover through hole. The inverter is positioned outside of a motor housing of the electric motor. The connection rod electrically connects a motor stator of the electric motor to the inverter. The connection rod extends through the cover through hole. The connection rod seal includes a body. The body includes a seal through hole formed therein. The seal through hole receives the connection rod. The radial seal is positioned within the seal through hole and forms a seal with the connection rod. The face seal is positioned at a bottom surface of the body and extends. The radial seal is positioned within the seal through hole and forms a seal between the connection rod seal and the connection rod. The radial seal is incorporated into one of the connection rod seal and the connection rod. The face seal is positioned between a bottom surface of the body and an outer surface of the motor cover. The face seal extends completely around the seal through hole and the connection rod at the bottom surface, forms a seal between the bottom surface of the body and an outer surface of the motor cover, and is incorporated into one of the connection rod seal and the motor cover. The at least one wheel is coupled to the vehicle body and is adapted to be driven by the electric axle via a drive train.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Again, in various embodiments, the present disclosure relates to an e-axle with a connection rod to inverter connection being made outside of the electric motor, such that the inverter is positioned outside of the electric motor and a fluid seal at the connection rod/motor cover interface is formed via connection rod seals that each include a radial seal and a face seal. The radial seal is adapted to form a seal with the connection rod and the face seal is adapted to form a seal with the motor cover. By forming the connection between the connection rods and the inverter outside of the electric motor, the connection of the connection rods to the inverter can be made outside of the electric motor, with both hand a visual access that does not require an access panel/window. Furthermore, with both the radial seal being formed with the connection rod and the face seal being formed with the motor cover, the cover through holes for the connection rods can be oversized to accommodate potential misalignment between the connection rods and the motor cover during assembly of the e-axle while ensuring that cooling fluid within the motor used for cooling the electric motor, such as via direct cooling, does not leak through the motor cover.

Figure 1:
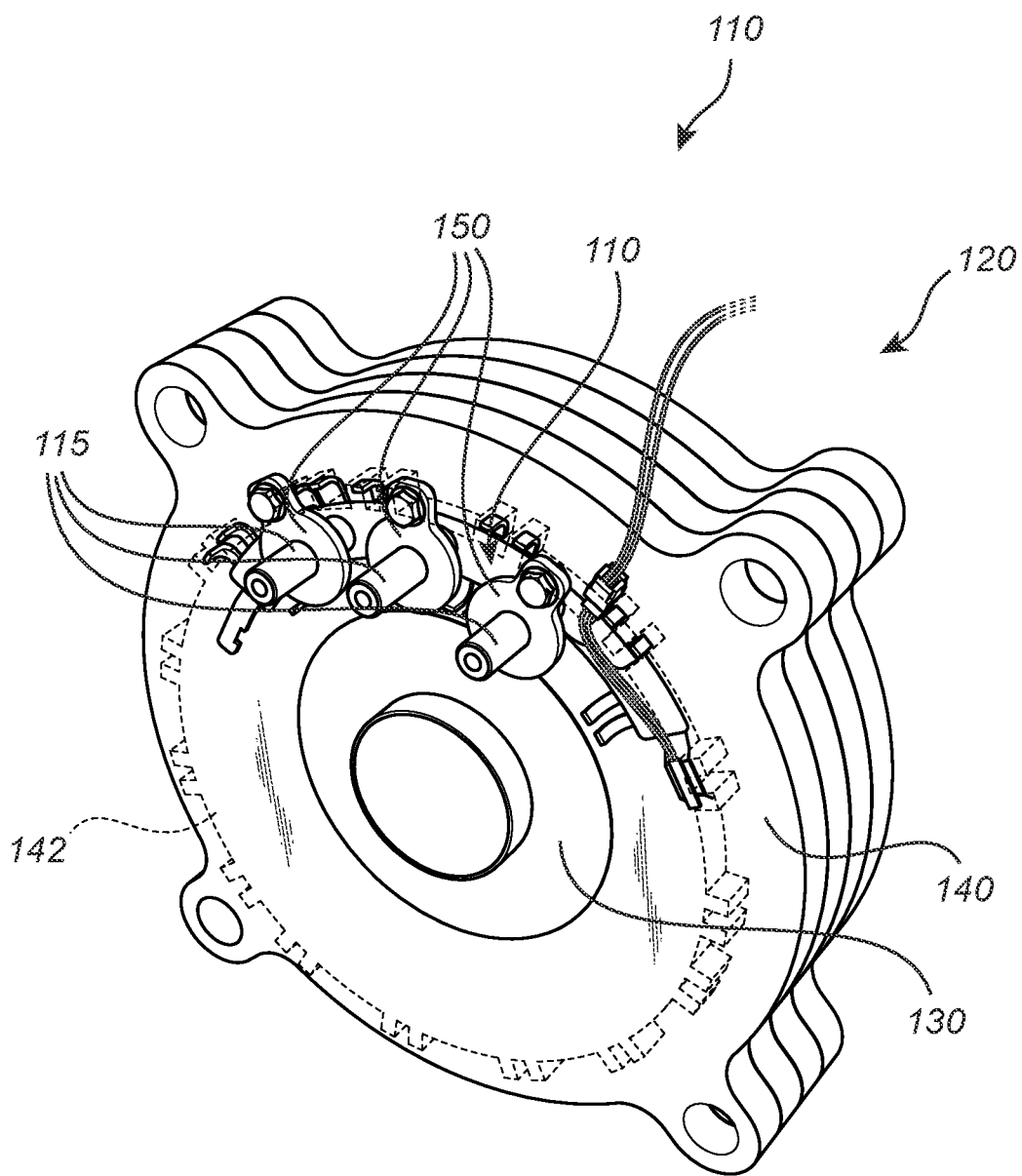
FIG. 1 is a perspective view of one illustrative embodiment of a portion of an e-axle of the present disclosure.
Figure 2:
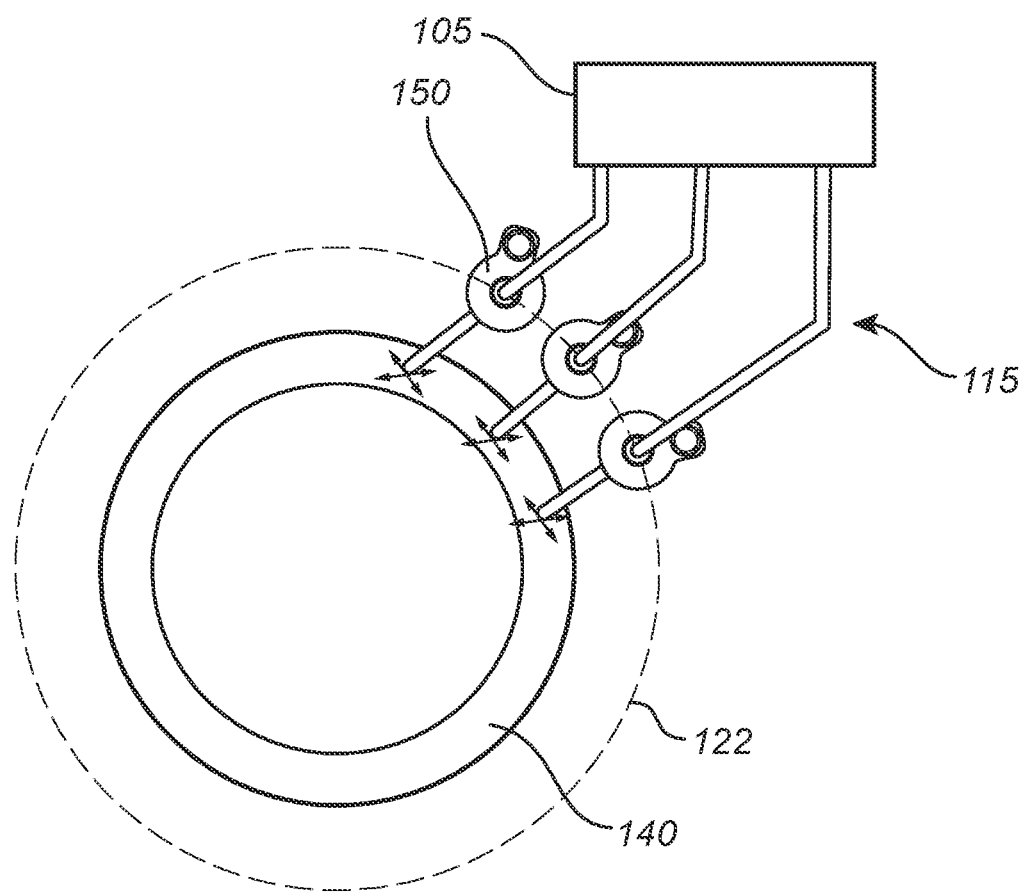
FIG. 2 is a schematic diagram of the e-axle of FIG. 1 highlighting a high-current, high-voltage connection between an inverter and a motor stator of the e-axle.

FIG. 1 is a perspective view of one illustrative embodiment of a portion of an e-axle 100 of the present disclosure. FIG. 2 is a schematic diagram of the e-axle 100 of FIG. 1 highlighting a high-current, high-voltage connection between an inverter 105 and a motor stator 140 of the e-axle 100. Referring to FIGS. 1 and 2, the e-axle 100 includes an electric motor 120, the inverter 105, connection rods 115, and connection rod seals 150. In embodiments, the electric motor 110 includes a motor stator 140 and a motor rotor 130. The motor stator 140 is adapted to receive power from the inverter 105, via the connection rods 115, and to cause the motor rotor 130 to rotate and drive a propulsion device of a vehicle.

In embodiments, the motor stator 140 includes a busbar 110 that is adapted to receive three-phase Alternating Current ("AC") power from the inverter 105 via the connection rods 115. The connection rods 115 are adapted to form a high-voltage, high-current electrical connection between the inverter 105 and the busbar 110 to provide the three-phase AC power to the motor stator 140. The connection rods 115 are formed of a conductive material, such as copper. The inverter 105 is positioned outside of the motor housing 122. By positioning the inverter 105 outside of the motor housing 122, the overall packaging size of the e-axle 100, and in particular, the electric motor 120 can be reduced. Further both hand and visual access for forming the connection of the connection rods 115 to the inverter 105 can be improved as the connection point to the inverter 105 is moved outside of the motor housing 122.

In embodiments, the electric motor 120 includes direct-cooling utilizing a cooling fluid, such as oil, to directly cool the components thereof, such as various components of the motor stator 140 and the motor rotor 130. As will be described in further detail below, the connection rod seals 150 are adapted to form a seal between the inverter 105 ("dry" side of the motor housing 122) and the motor stator 140 ("wet" side of the motor housing 122).

Figure 3:
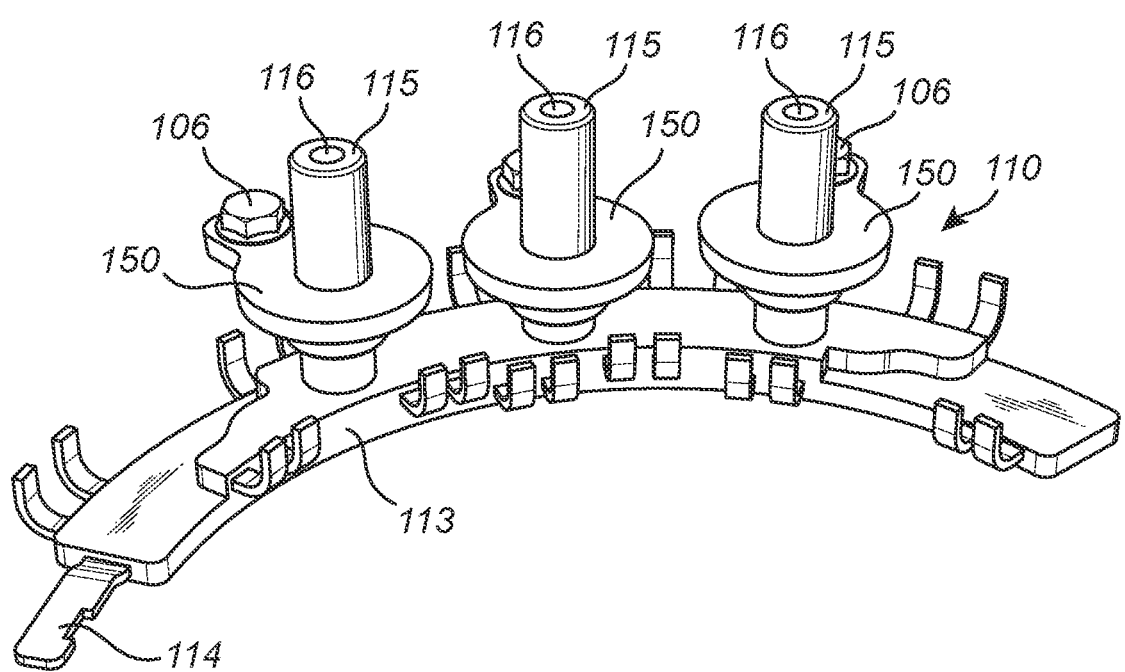
FIG. 3 is a perspective view of one illustrative embodiment of the connection of FIG. 3 utilizing a busbar to form an electrical connection between the connection rods and the motor stator.

FIG. 3 is a perspective view of one illustrative embodiment of the connection of FIG. 2 utilizing the busbar 110 to form an electrical connection between the connection rods 115 and the motor stator 140. Referring to FIG. 3, the busbar 110 is electrically connected to coils of the motor stator 140, which are adapted to induce movement in the motor rotor 130. In various embodiments, the busbar 110 generally includes an arcuate shape that matches a curvature of the portion of the motor stator 140 that the busbar 110 is connected to. In various embodiments, the busbar 110 includes a neutral plate 114 and phase plates 112 (refer to FIG. 5) contained within an overmold 113.

The connection rods 115 extend outward from the busbar 110. Each connection rod 115 includes a connection rod seal 150 thereon that is adapted to seal the dry side of the motor housing 122 from the wet side of the motor housing 122. In various embodiments, each connection rod 115 includes a connection feature 116 (refer to FIG. 5), such as an internally-threaded hole, at an end distal to the busbar 110 adapted for connection to the inverter 105, such as via an inverter cable.

Figure 4:
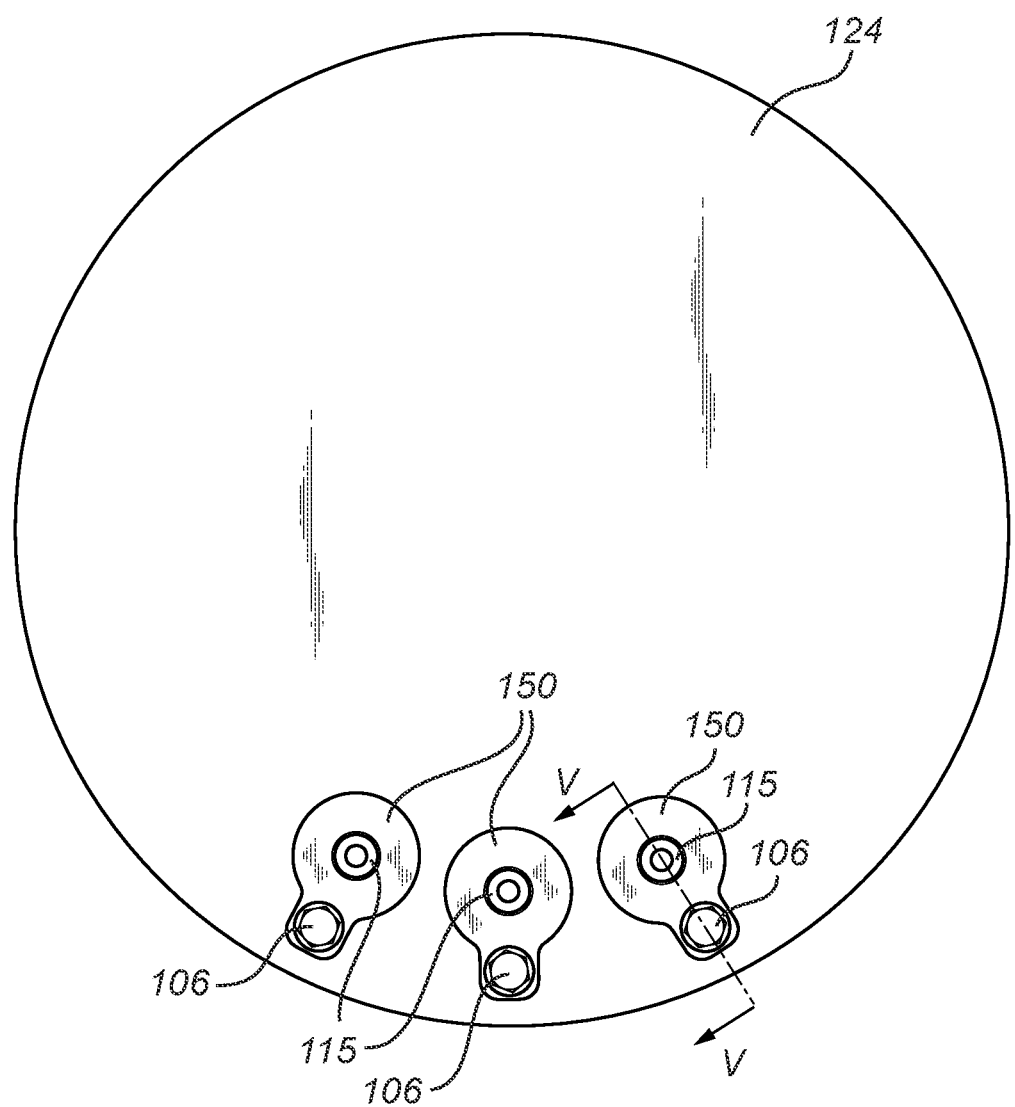
FIG. 4 is a top perspective view of one illustrative embodiment of the e-axle of FIG. 1 highlighting sealing between the connection rods and a motor cover.
Figure 5:
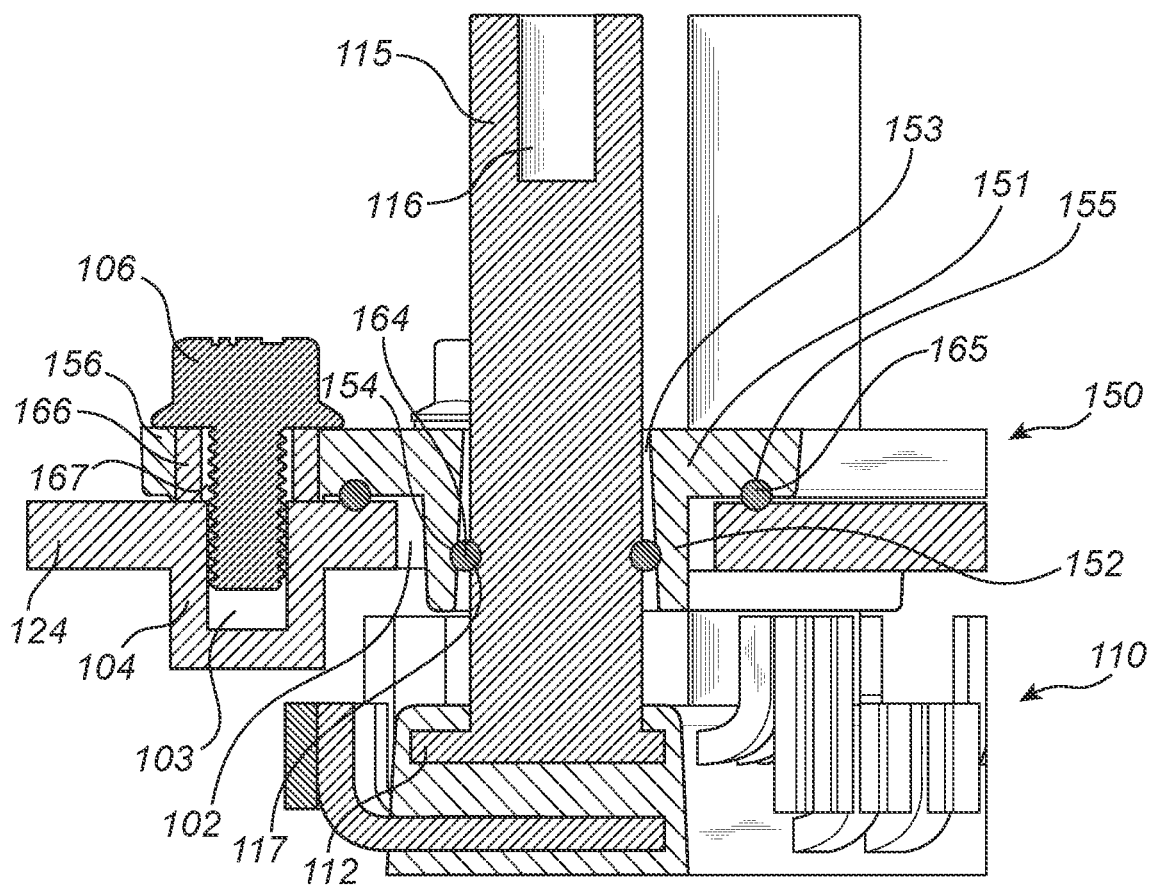
FIG. 5 is a cross-sectional view of the illustrative embodiment of FIG. 4 taken along the line V-V.

FIG. 4 is a top perspective view of one illustrative embodiment of the e-axle 100 of FIG. 1 highlighting sealing between the connection rods 115 and a motor cover 124. FIG. 5 is a cross-sectional view of the illustrative embodiment of FIG. 4 taken along the line V-V. Referring to FIGS. 4 and 5, the motor cover 124 includes cover through holes 102 formed therein, each cover through hole 102 adapted for a connection rod 115 to pass therethrough. In various embodiments, the cover through hole 102 is larger than the connection rod 115, such that there is a clearance therebetween.

In some embodiments, the connection rods 115 are right circular cylinders and the diameter of the cover through hole 102 is configured such that there is a radial clearance between the corresponding connection rod 115 and the internal circumferential surface of the cover through hole 102. This clearance allows each of the connection rods 115 to pass through a corresponding cover through hole 102 even in worst-case tolerance conditions.

In various embodiments, the motor cover 124 includes internally-threaded bores 103 formed therein. The internally-threaded bores 103 are each adapted to receive a fastener 106. The fastener 106 is adapted to fasten a respective connection rod seal 150 to the motor cover 124. In some of these embodiments, the motor cover 124 includes a protrusion 104 that extends from an inward facing side of the motor cover 124. The protrusion 104 includes a portion of the internally-threaded bore 103.

The connection rod seal 150 includes a radial seal 164 and a face seal 165. The radial seal 164 is adapted to form a seal with a corresponding connection rod 115, such as with an outer surface of the connection rod 115. The face seal 165 is adapted to form a seal with an outer surface of the motor cover 124.

Figure 6:
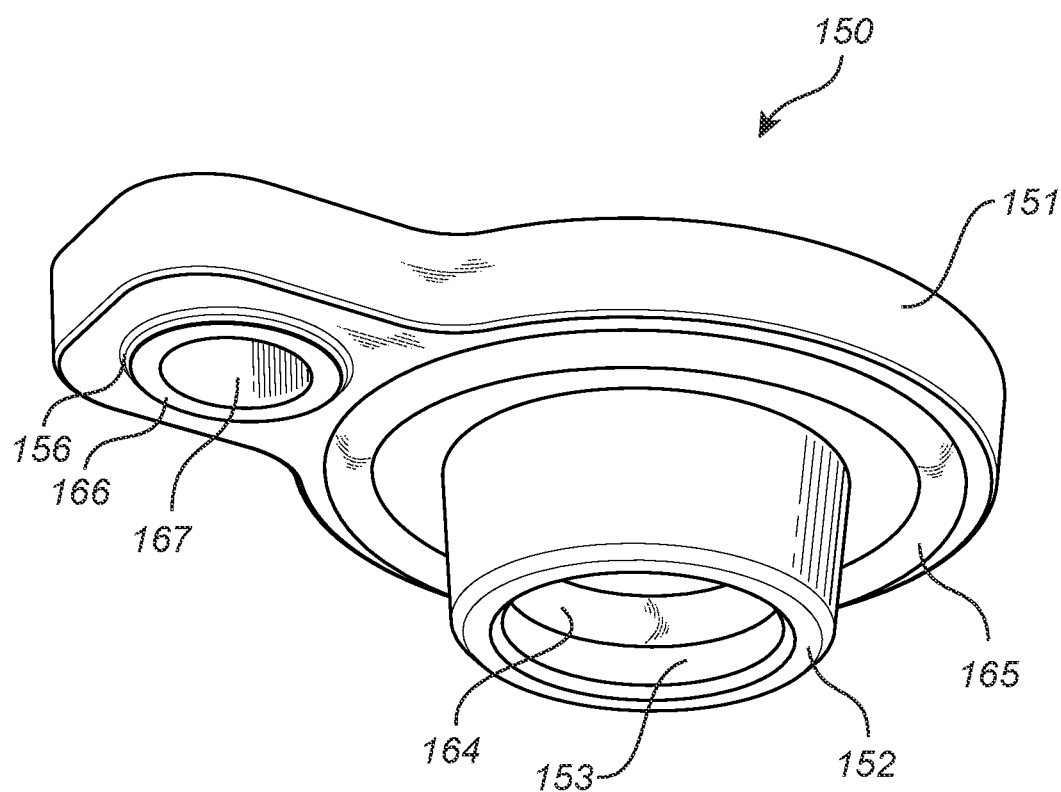
FIG. 6 is a perspective view of one illustrative embodiment of a connection rod seal of the present disclosure.
Figure 7:
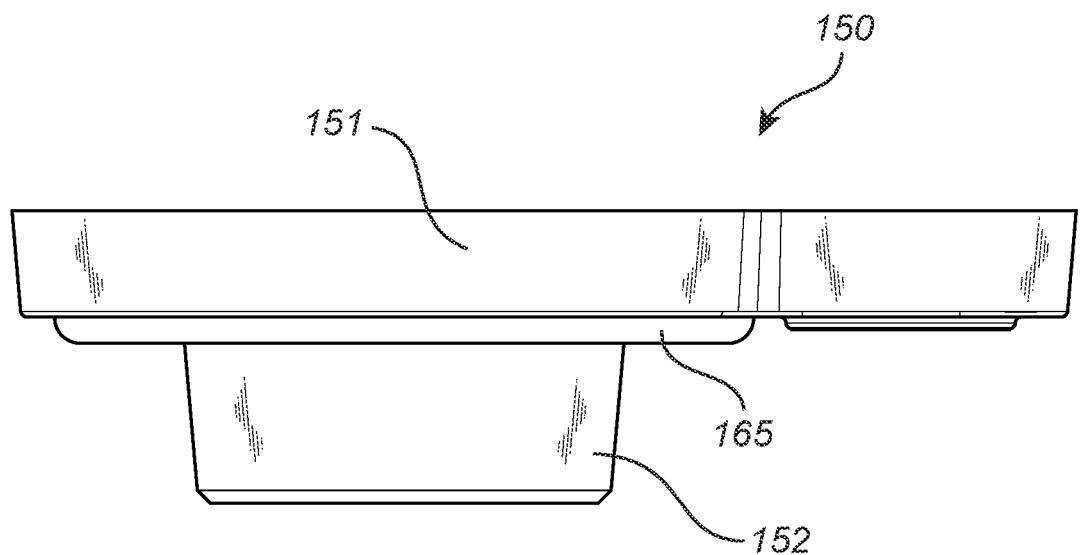
FIG. 7 is a side view of the illustrative embodiment of the connection rod seal of FIG. 6.
Figure 8:
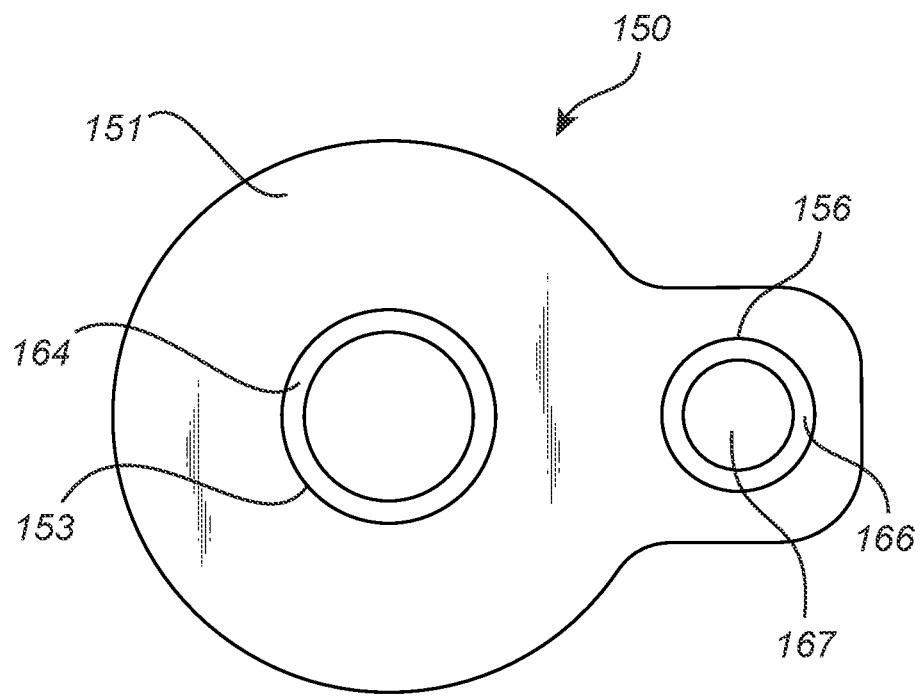
FIG. 8 is a top view of the illustrative embodiment of the connection rod seal of FIG. 6.
Figure 9:
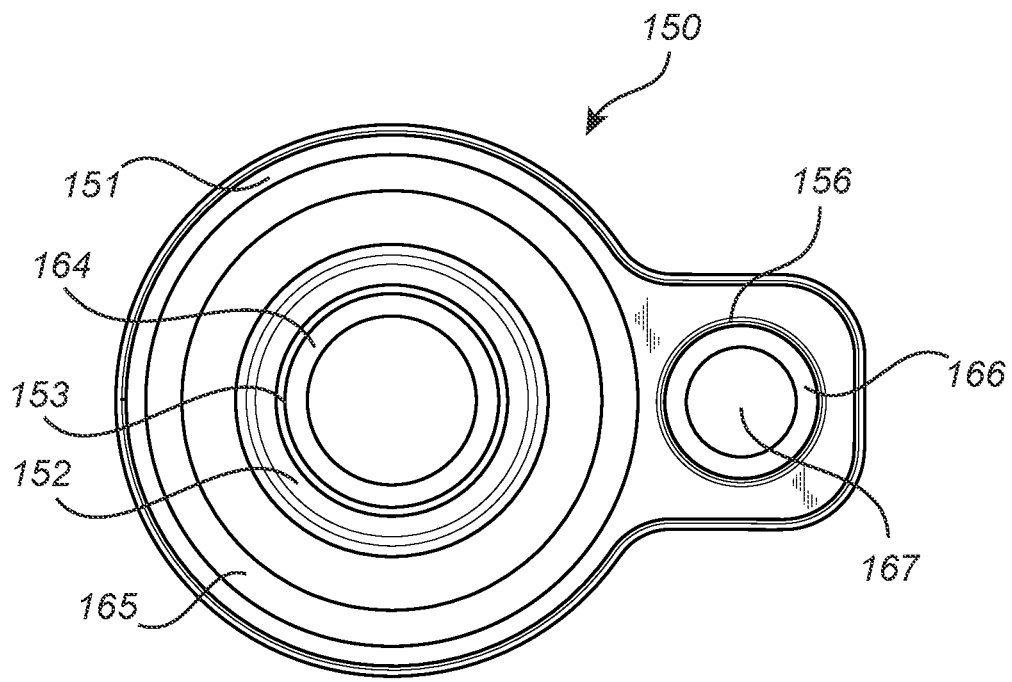
FIG. 9 is a bottom view of the illustrative embodiment of the connection rod seal of FIG. 6.

FIG. 6 is a perspective view of one illustrative embodiment of a connection rod seal of the present disclosure. FIG. 7 is a side view of the illustrative embodiment of the connection rod seal of FIG. 6. FIG. 8 is a top view of the illustrative embodiment of the connection rod seal of FIG. 6. FIG. 9 is a bottom view of the illustrative embodiment of the connection rod seal of FIG. 6. Referring to FIGS. 4-9, in embodiments, the connection rod seal 150 includes a body 151 and a seal through hole 153 formed therein. The seal through hole 153 is adapted to receive a corresponding connection rod 115. The radial seal 164 is positioned within the seal through hole 153 and is adapted to form a seal between the corresponding connection rod 115 and an internal surface that forms the seal through hole 153. The face seal 165 is positioned at a bottom surface of the body 151 and is adapted to form a seal between a bottom surface of the body 151 and the top/outer surface of the motor cover 124. In embodiments, the face seal 165 extends completely around the seal through hole 153. In some embodiments, each of the radial seal 164 and the face seal 165 comprises an O-ring.

In embodiments, the connection rod seal 150 also includes a hollow protrusion 152 extending from a bottom of the body 151. In these embodiments, the seal through hole 153 extends through both of the body 151 and the hollow protrusion 152, and the radial seal 164 is positioned within the hollow protrusion 152 and the face seal 165 extends completely around the hollow protrusion 152 as well as the connection rod 115 while the connection rod 115 is received in the seal through hole 153. In some embodiments, the hollow protrusion 152 is a hollow circular cylinder, such as a hollow right circular cylinder, and the seal through hole 153 is cylindrical. In these embodiments, the face seal 165 is positioned radially outward from the seal through hole 153 and the hollow protrusion 152.

In some embodiments, an inner surface of the seal through hole 153 is tapered, such that a bottom opening of the seal through hole 153 is larger than a top opening of the seal through hole 153. In some embodiments, the inner surface of the seal through hole 153 includes a frustoconical shape. In other embodiments, an outer surface of the connection rod 115 is tapered, such that an outer diameter of the taper closest to the bus bar 110 is larger than an outer diameter of the taper closest to the inverter 105. In some embodiments, an outer surface of the radial seal 164 includes a taper. By tapering one or more of the inner surface of the seal through hole 153, the outer surface of the connection rod 115, and the outer surface of the radial seal 164, assembly can be facilitated, such as by controlling both axial positioning and radially interference between the connection rod seal 150, the connection rod 115, and the radial seal 164.

As can be seen in FIG. 5, in some embodiments, the hollow protrusion 152 is adapted to extend through the cover through hole 102 (a length of the hollow protrusion 152 being longer than a thickness of the motor cover 124) and is sized smaller than the cover through hole 102 such that there is a gap therebetween while the hollow protrusion 152 is inserted therein. This sizing accommodates any variances and misalignment of the cover through holes 102 relative to the connection rods 115. In some of these embodiments, an outer diameter of the hollow protrusion 152 is smaller than the inner diameter of the cover through hole 102 to form the gap therebetween.

As can be seen in FIG. 5, in some embodiments, the body 151 includes a radial slot 154 formed therein and positioned at an internal surface of the seal through hole 153 and that is adapted to receive the radial seal 164, and the body 151 also includes a face slot 155 formed therein and positioned at a bottom surface thereof around the seal through hole 153/hollow protrusion 152 and that is adapted to receive the face seal 165. In these embodiments, the radial seal 164 and the face seal 165 are secured to the body 151 in the respective radial slot 154 and face slot 155, such as via an adhesive (such as an O-ring adhesive).

While the radial seal 164 and the face seal 165 are shown as separate components than the body 151 in the embodiments illustrated, in some embodiments, the radial seal 164 and the face seal 165 are integrally formed with the body 151 as a unitary structure, such as a single injection mold.

Furthermore, while the radial seal 164 and the face seal 165 are shown as being secured to the body 151 of the connection rod seal 150, in other embodiments, the radial seal 164 and the face seal 165 are secured to the outer radial surface of the connection rod 115 and to the outer surface of the motor cover 124 respectively, such as via an adhesive. As such, in various embodiments, the radial seal 164 is incorporated into one of the connection rod seal 150 (such as into the body 151 via the adhesive or formed therewith) and the connection rod 115, and the face seal 165 is incorporated into one of the connection rod seal 150 (such as into the body 151 via the adhesive or formed therewith) and the motor cover 124.

In various embodiments, connection rod seal 150, and in particular, the hollow protrusion 152, is formed of a non-conductive material, such as hard plastic, that can act as a dielectric between the connection rod 115 and the motor cover 124, which adds a conductive barrier/shield therebetween. The connection rod seal 150 is also formed of a material that is compatible with a cooling fluid, such as oil, to ensure longevity thereof.

In various embodiments, the body 151 also includes a fastening hole 156 formed therethrough. In some embodiments, the fastening hole 156 is sized to receive a compression limiter 166 that is adapted to control compression of the body 151 that can occur when a fastener 106 is positioned in the fastening hole 156 and connected to the motor cover 124 to join the body 151 to the motor cover 124 via the internally-threaded bore 103 of the motor cover 124. The compression limiter 166 including a through hole 167 for the threads of the fastener 106 to extend therethrough. The fastener 106 is adapted to provide a sufficient clamp load on the face seal 165 between the body 151 and the motor cover 124. In some embodiments, the fastening hole 156 is oversized such that there is a gap between the threads of the fastener 106 and the fastening hole 156/compression limiter 166. The gap between the threads of the fastener 106 and the fastening hole 156/compression limiter 166 is commensurate to the gap between the motor cover 124 and the connection rod 115/hollow protrusion 152 of the connection rod seal 150 at the cover through hole 102. In some of these embodiments, the head of the fastener 106 is oversized to account for the gap between the threads of the fastener 106 and the fastening hole 156/compression limiter 166.

Figure 10:
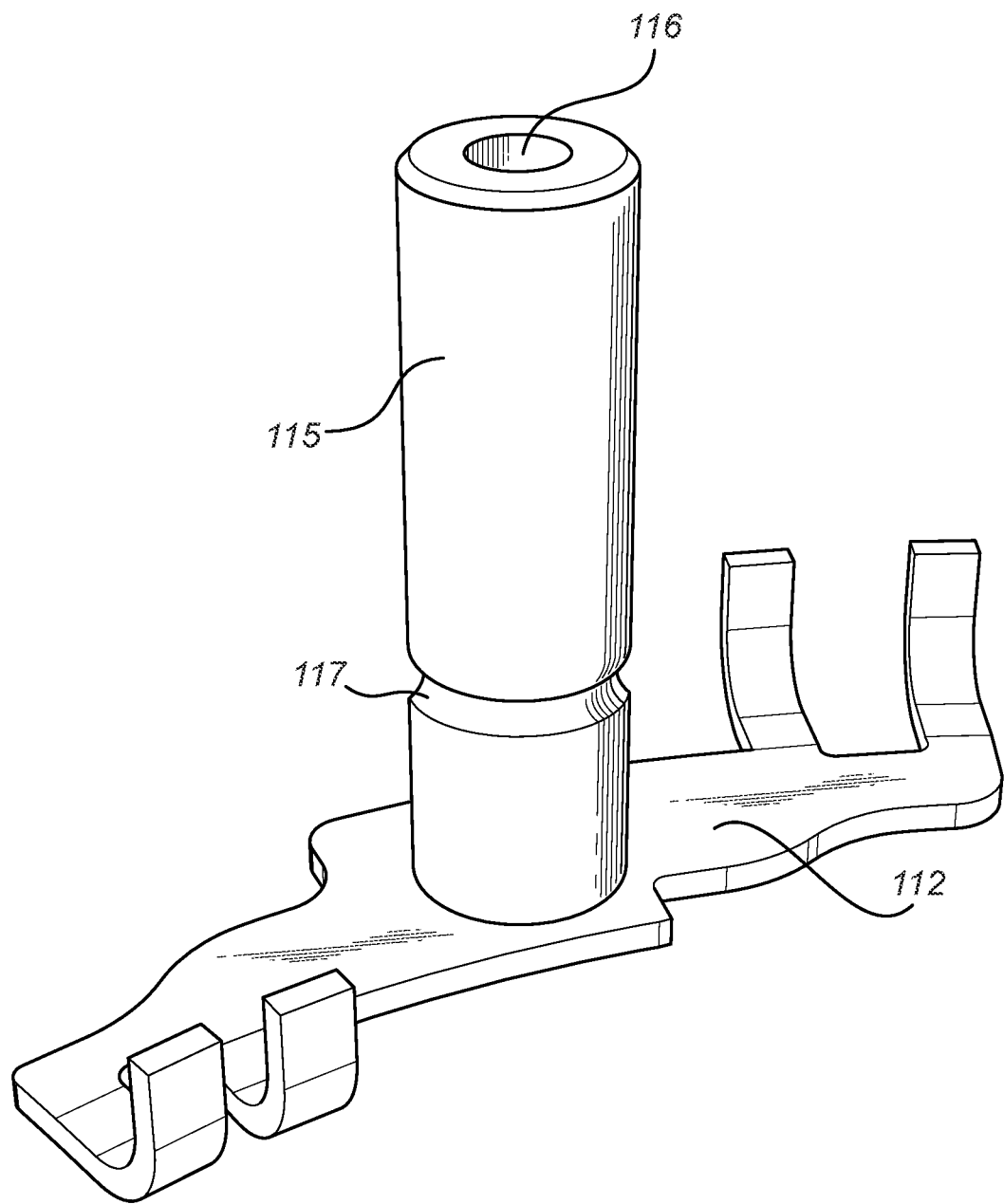
FIG. 10 is a perspective view of one illustrative embodiment of a connection rod joined to a phase plate.

FIG. 10 is a perspective view of one illustrative embodiment of a connection rod 115 joined to a phase plate 112. In various embodiments, each connection rod 115 is robustly attached to a corresponding phase plate 112, such as via a resistance welding technique. In embodiments, each connection rod 115 includes a sealing slot 117 formed in an outer surface thereof that is adapted to receive an internal portion of the radial seal 165. In some of these embodiments, the sealing slot 117 is an annular slot. In various embodiments, the sealing slot 117 is adapted to at least partially hold the connection rod seal 150 in place to help ensure that contact between the face seal 165 and the outer surface of the motor cover 124 is maintained, such as by functioning similar to a snap fit with the radial seal 165.

As can be seen in FIG. 5, in embodiments, an internal diameter of the radial seal 164 is smaller than an outer diameter of the connection rod 115, such that upon receipt of the radial seal 164 within the sealing slot 117 there is axial interference between the connection rod 115 and the radial seal 164 to maintain an axial position of the connection rod seal 150/body 151 relative to the connection rod 115 and to the motor cover 124.

Figure 11:
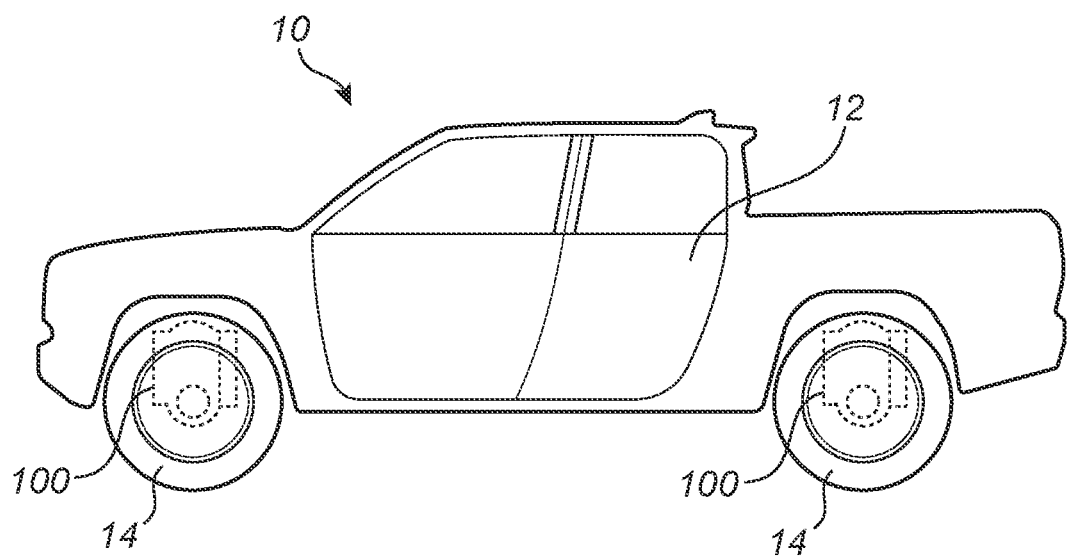
FIG. 11 is a schematic diagram of one illustrative embodiment of a vehicle of the present disclosure.

FIG. 11 is a schematic diagram of one illustrative embodiment of a vehicle 10 of the present disclosure. Referring now to FIG. 11, in various embodiments the vehicle 10 includes a vehicle body 12 and at least one wheel 14 coupled to the vehicle body 12 that is adapted to be driven by at least one e-axle 100 of the present disclosure, including the motor stator 140 and the motor rotor 130 that is coupled to a drivetrain for the at least one wheel 14. For example, as depicted in FIG. 1, the motor rotor 130 is configured to rotate relative to the motor stator 140, and the motor stator 140 is electrically couplable to receive AC power from the inverter 105. The electric motor 120 is adapted for direct cooling of the motor stator 140 and the motor rotor 130, while the connection rod seal(s) 150 are adapted to ensure that the cooling fluid (such as oil) does not leak through the cover 124 of the electric motor 120.

Figure 12:
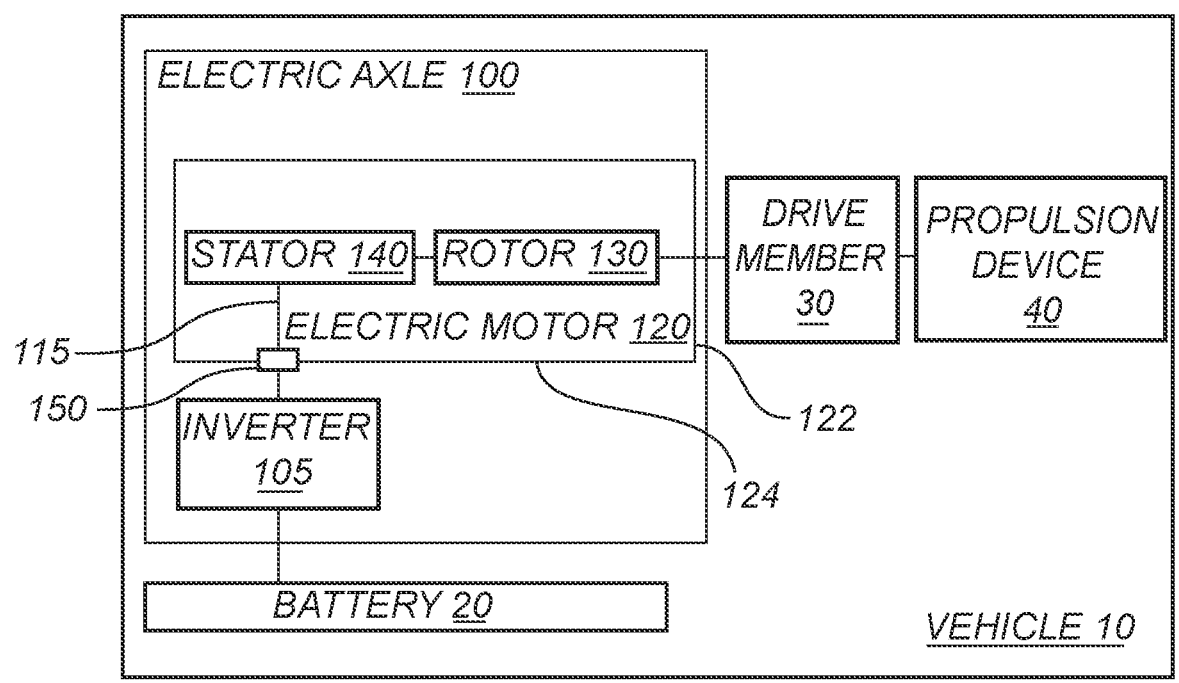
FIG. 12 is a block diagram of another illustrative embodiment of a vehicle of the present disclosure.

FIG. 12 is a block diagram of another illustrative embodiment of a vehicle of the present disclosure. Referring to FIG. 12, in various embodiments an illustrative vehicle 10 includes at least one drive member 30, at least one propulsion device 40, at least one electric axle 100, and at least one battery 20. The at least one propulsion device 40 is coupled to the at least one drive member 30. The at least e-axle 100 includes a housing 122 that includes the cover 124. The electric motor 114 is disposed in the housing 120. The electric motor 120 includes the motor stator 140 having exposed end windings and a motor rotor 130 configured to rotate relative to the motor stator 140. The motor rotor 130 is coupled to the at least one drive member 30.

The inverter 105 is electrically coupled to the motor stator 140 and to a battery 20 of the vehicle 10. The inverter 105 is configured to deliver power from the battery 20 to the motor stator 140 via connection rods 115, while the connection rod seal(s) 150 are adapted to ensure that the cooling fluid (such as oil) does not leak through the cover 124 of the electric motor 120. Details of the e-axle 100, the electric motor 114, the motor rotor 115, the motor stator 109, the inverter 105, the connection rods 115, and the connection rod seals 150 have been described above and, for sake of brevity, details of their construction and operation are not repeated (and need not be repeated for an understanding by a person of skill in the art).

It will be appreciated that the vehicle 10 can be any type of vehicle whatsoever as desired without limitation. Given by way of non-limiting example, in various embodiments the vehicle 10 may be an electric vehicle (that is, an all-electrically driven vehicle) or a hybrid vehicle. For example, and given by way of non-limiting examples, in various embodiments the vehicle 10 may include a motor vehicle driven by wheels, such as the vehicle 10 illustrated in FIG. 11, and/or tracks, such as, without limitation, an automobile, a truck, a sport utility vehicle (SUV), a van, an all-terrain vehicle (ATV), a motorcycle, an electric bicycle, a tractor, a lawn mower such as without limitation a riding lawn mower, a snowmobile, and the like. Given by way of further non-limiting examples, in various embodiments the vehicle 10 may include a marine vessel such as, without limitation, a boat, a ship, a submarine, a submersible, an autonomous underwater vehicle (AUV), and the like. Given by way of further non-limiting examples, in various embodiments the vehicle 10 may include an aircraft such as, without limitation, a fixed wing aircraft, a rotary wing aircraft, and a lighter-than-air (LTA) craft.

In various embodiments the e-axle (or e-axles) 100 are configured to drive the vehicle 10 via the corresponding electric motor(s) 120 thereof. That is, in various embodiments the e-axle (or e-axles) 100 may drive any drive member 30 that drives any propulsion device 40, such as without limitation a wheel or wheels, a track or tracks, a propellor or propellors, a propulsor or propulsors, a rotor or rotors, or the like, associated with the vehicle 10.

For example, in some embodiments in a motor vehicle one e-axle 100 and its corresponding electric motor 120 may be configured to drive one drive member 30 such as an axle or a chain ring that drives one wheel or track, in some other embodiments in a motor vehicle one e-axle 100 and its corresponding electric motor 120 may be configured to drive an axle that rotates two wheels or two tracks, and in some other embodiments in a motor vehicle one e-axle 100 and its corresponding electric motor 120 may be configured to drive an axle that rotates one wheel or one track and another e-axle 100 and its corresponding electric motor 120 is configured to drive another axle that rotates another wheel or another track.

Similarly, in some embodiments in a marine vessel one e-axle 100 and its corresponding electric motor 120 may be configured to drive one propeller or propulsor, in some other embodiments in a marine vessel one e-axle 100 and its corresponding electric motor 120 may be configured to drive a shaft that rotates two propellers or two propulsors, and in some other embodiments in a marine vessel one e-axle 100 and its corresponding electric motor 120 may be configured to drive a shaft that rotates one propeller or propulsor and another e-axle 100 and its corresponding electric motor 120 may be configured to drive another shaft that rotates another propeller or propulsor.

Likewise, in some embodiments in an aircraft one e-axle 100 and its corresponding electric motor 120 may be configured to drive one propeller or rotor, in some other embodiments in an aircraft one e-axle 100 and its corresponding electric motor 120 may be configured to drive a shaft that rotates two propellers or two rotors, and in some other embodiments in an aircraft one e-axle 100 and its corresponding electric motor 120 may be configured to drive a shaft that rotates one propeller or rotor and another e-axle 100 and its corresponding electric motor 120 may be configured to drive another shaft that rotates another propeller or rotor.

In accordance with the various embodiments disclosed herein, a robust, efficient, and effective connection between an inverter and electric motor is formed via connection rods with the inverter and the connection thereto being formed outside of the motor housing (such as via inverter cables connected to internally threaded holes in the connection rods), while maintaining a seal at the interface between the motor cover and the connection rods. Forming the connection between the inverter and the connection rods outside of motor housing provides both hand and visual access without the need for an access panel/window being placed in the motor housing, thus, reducing complexity of the overall assembly. Further, by positioning the inverter outside of the motor housing, the overall package size can be reduced.

Again, the seal at the connection rods/motor cover interface is formed via connection rod seals that include both a radial seal for forming a seal with the connection rods and a face seal forming a seal with the motor cover, which allows for the seal between with the motor cover to float depending on the position of the corresponding connection rod. The floating of the face seal at the motor cover thus allows that cover through holes that the connection rods pass through to be oversized to accommodate potential misalignment therebetween, even in worst-case tolerance conditions thereof. By accommodating potential misalignment of the connection rods, the connection rods can be rigid and form a rigid connection between the motor stator and the busbar. With this rigid connection, a set of busbars can be eliminated compared to a traditional design, resulting in overall reduced resistance in the inverter to stator electrical pathways, less thermal losses, and higher efficiency. Further, removing a busbar set also means less Bill of materials cost, less mass, and a reduction in assembly time/cost.

In some of these embodiments, along with forming an effective seal at the connection rod/motor cover interface to ensure that cooling fluid contained within the electric motor does not leak, the connection rod seals can be formed of an electrical insulating material to electrically insulate any surrounding conductive of the electric motor, such as the motor housing and the motor cover, from the high-voltage and high-current passing through the connection rods.

Although the present disclosure is illustrated and described with reference to illustrative embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A connection rod seal for sealing an interface between a connection rod and a motor cover of an electric motor, the connection rod seal comprising:
a body including a through hole formed therein, the through hole adapted to receive the connection rod;
a radial seal positioned within the through hole and adapted to form a seal with the connection rod; and
a face seal positioned at a bottom surface of the body and extending completely around the through hole at the bottom surface, the face seal adapted to form a seal with an outer surface of the motor cover.

2. The connection rod seal of claim 1, wherein the body includes a hollow protrusion extending from the bottom surface, wherein the through hole extends through the hollow protrusion, and wherein the face seal extends completely around the hollow protrusion.

3. The connection rod seal of claim 2, wherein the hollow protrusion is a hollow circular cylinder and the face seal is positioned radially outward at the bottom surface relative to the hollow protrusion.

4. The connection rod seal of claim 2, wherein the hollow protrusion is adapted to extend through a hole formed in the motor cover and is sized smaller than the hole such that there is a gap therebetween while the hollow protrusion is inserted therein.

5. The connection rod seal of claim 1, wherein the body includes a radial slot formed in an inner surface of the through hole that is adapted to receive the radial seal and a face slot formed in the bottom surface, around the through hole, that is adapted to receive the face seal.

6. The connection rod seal of claim 1, wherein the body is formed of a non-conductive material and is adapted to act as a dielectric between the connection rod and the motor cover.

7. An electric axle, comprising:
an electric motor including a motor cover, the motor cover including a cover through hole formed therein;
an inverter positioned outside of a motor housing of the electric motor;
a connection rod electrically connecting a motor stator of the electric motor to the inverter, the connection rod extending through the cover through hole;
a connection rod seal including a body including a seal through hole formed therein, the seal through hole receiving the connection rod;
a radial seal positioned within the seal through hole and forming a seal between the connection rod seal and the connection rod, the radial seal being incorporated into one of the connection rod seal and the connection rod; and
a face seal positioned between a bottom surface of the body and an outer surface of the motor cover, the face seal extending completely around the seal through hole and the connection rod at the bottom surface, forming a seal between the bottom surface of the body and an outer surface of the motor cover, and being incorporated into one of the connection rod seal and the motor cover.

8. The electric axle of claim 7, wherein the body includes a hollow protrusion extending from the bottom surface, wherein the seal through hole extends through the hollow protrusion and the face seal extends completely around the hollow protrusion.

9. The electric axle of claim 8, wherein the hollow protrusion is a hollow circular cylinder and the face seal is positioned radially outward at the bottom surface relative to the hollow protrusion and the hollow protrusion extends through the cover through hole and is sized smaller than the cover through hole such that there is a gap therebetween.

10. The electric axle of claim 8, wherein the motor cover includes an internally-threaded bore formed therein that is offset from the cover through hole, the body of the connection rod seal includes a fastening hole formed therethrough that is offset from the seal through hole, and wherein the electronic axle further comprises a fastener extending through the seal through hole and mated to the internally-threaded bore.

11. The electric axle of claim 7, wherein the body includes a radial slot formed in an inner surface of the seal through hole that is adapted to receive the radial seal and a face slot formed in the bottom surface, around the seal through hole, that is adapted to receive the face seal.

12. The electric axle of claim 7, wherein the body is formed of a non-conductive material and is adapted to act as a dielectric between the connection rod and the motor cover.

13. The electric axle of claim 7, wherein the connection rod includes a sealing slot formed in an outer surface thereof with an internal portion of the radial seal received therein such that the connection rod seal is at least partially held in place thereby.

14. A vehicle, comprising:
a vehicle body;
an electric axle comprising:
an electric motor including a motor cover, the motor cover including a cover through hole formed therein;
an inverter positioned outside of a motor housing of the electric motor;
a connection rod electrically connecting a motor stator of the electric motor to the inverter, the connection rod extending through the cover through hole;
a connection rod seal including a body including a seal through hole formed therein, the seal through hole receiving the connection rod;

a radial seal positioned within the seal through hole and forming a seal between the connection rod seal and the connection rod, the radial seal being incorporated into one of the connection rod seal and the connection rod; and a face seal positioned between a bottom surface of the body and an outer surface of the motor cover, the face seal extending completely around the seal through hole and the connection rod at the bottom surface, forming a seal between the bottom surface of the body and an outer surface of the motor cover, and being incorporated into one of the connection rod seal and the motor cover; and at least one wheel coupled to the vehicle body and adapted to be driven by the electric axle via a drive train.

15. The vehicle of claim 14, wherein the body includes a hollow protrusion extending from the bottom surface, wherein the seal through hole extends through the hollow protrusion and the face seal extends completely around the hollow protrusion.

16. The vehicle of claim 15, wherein the hollow protrusion is a hollow circular cylinder and the face seal is positioned radially outward at the bottom surface relative to the hollow protrusion and the hollow protrusion extends through the cover through hole and is sized smaller than the cover through hole such that there is a gap therebetween.

17. The vehicle of claim 15, wherein the motor cover includes an internally-threaded bore formed therein that is offset from the cover through hole, the body of the connection rod seal includes a fastening hole formed therethrough that is offset from the seal through hole, and wherein the electronic axle further comprises a fastener extending through the seal through hole and mated to the internally-threaded bore.

18. The vehicle of claim 14, wherein the body includes a radial slot formed in an inner surface of the seal through hole that is adapted to receive the radial seal and a face slot formed in the bottom surface, around the seal through hole, that is adapted to receive the face seal, and the radial seal and the face seal are connected to the body via an adhesive.

19. The vehicle of claim 14, wherein the body is formed of a non-conductive material and is adapted to act as a dielectric between the connection rod and the motor cover.

20. The vehicle of claim 14, wherein the connection rod includes a sealing slot formed in an outer surface thereof with an internal portion of the radial seal received therein such that the connection rod seal is at least partially held in place thereby.

* * * * *